United States Patent [19]

Quick et al.

[11] 4,188,284
[45] Feb. 12, 1980

[54] PROCESS FOR THE HYDROTREATING OF HEAVY HYDROCARBON STREAMS

[75] Inventors: Leonard M. Quick, Naperville, Ill.; Albert L. Hensley, Jr., Munster, Ind.

[73] Assignee: Standard Oil Company (Indiana), Chicago, Ill.

[21] Appl. No.: 967,432

[22] Filed: Dec. 7, 1978

Related U.S. Application Data

[63] Continuation-in-part of Ser. No. 862,848, Dec. 21, 1977, abandoned.

[51] Int. Cl.$^2$ ............................................. C10G 23/02
[52] U.S. Cl. ........................... 208/216 PP; 208/251 H; 208/254 H
[58] Field of Search ......... 208/216 PP, 216 R, 254 H, 208/251 H

[56] References Cited

U.S. PATENT DOCUMENTS

| | | | |
|---|---|---|---|
| 2,577,823 | 12/1951 | Stine | 208/216 R |
| 3,114,701 | 12/1963 | Jacobson et al. | 208/254 H |
| 3,245,919 | 4/1966 | Gring et al. | 208/216 PP |
| 3,265,615 | 8/1966 | Buss | 208/216 R |
| 3,340,180 | 9/1967 | Beuther et al. | 208/216 PP |
| 3,956,105 | 5/1976 | Conway | 208/216 PP |
| 3,977,961 | 8/1976 | Hamner | 208/251 H |
| 4,008,149 | 2/1977 | Itoh et al. | 208/216 PP |
| 4,066,574 | 1/1978 | Tamm | 208/216 PP |

FOREIGN PATENT DOCUMENTS

| | | | |
|---|---|---|---|
| 2281972 | 12/1976 | France | 208/216 PP |
| 1367243 | 9/1974 | United Kingdom | 208/216 PP |

*Primary Examiner*—George Crasanakis
*Attorney, Agent, or Firm*—James L. Wilson; Arthur G. Gilkes; William T. McClain

[57] ABSTRACT

The process comprises contacting a heavy hydrocarbon stream containing metals and asphaltenes to reduce the contents of nitrogen compounds, sulfur compounds, metals and asphaltenes in the hydrocarbon stream under suitable conditions and in the presence of hydrogen with a catalyst comprising a hydrogenating component consisting essentially of molybdenum and chromium, their oxides, their sulfides, or mixtures thereof on a large-pore, catalytically active alumina. The catalyst has a pore volume within the range of about 0.4 cc/gm to about 0.8 cc/gm, a surface area within the range of about 150 m$^2$/gm to about 300 m$^2$/gm, and an average pore diameter within the range of about 100 Å to about 200 Å.

27 Claims, 1 Drawing Figure

PROCESS FOR THE HYDROTREATING OF HEAVY HYDROCARBON STREAMS

This application is a continuation-in-part application of copending application U.S. Ser. No. 862,848, which was filed in the U.S. Patent and Trademark Office on Dec. 21, 1977 now abandoned.

CROSS REFERENCE TO RELATED APPLICATIONS

Two applications are being filed concurrently with this application. The first of these, U.S. Ser. No. 967,413, is directed broadly to a process for hydrotreating a heavy hydrocarbon stream containing metals, asphaltenes, nitrogen compounds, and sulfur compounds, which process employs a catalyst comprising a hydrogenating component selected from the group consisting of (1) molybdenum, chromium, and a small amount of cobalt, (2) their oxides, (3) their sulfides, and (4) mixtures thereof on a suitable large-pore, catalytically active alumina. The second concurrently-filed application, U.S. Ser. No. 967,416, is directed to a process for the cracking of a heavy hydrocarbon stream containing metal and asphaltenes wherein the stream is first hydrotreated in the presence of a catalyst comprising a hydrogenating component comprising molybdenum and chromium, and optionally cobalt, on a large-pore alumina to produce a hydrotreated effluent and at least a portion of said hydrotreated effluent is then catalytically cracked.

BACKGROUND OF THE INVENTION

This invention is related to the catalytic treatment in the presence of hydrogen of heavy hydrocarbon streams containing asphaltenic material, metals, nitrogen compounds, and sulfur compounds.

It is widely known that various organometallic compounds and asphaltenes are present in petroleum crude oils and other heavy petroleum hydrocarbon streams, such as petroleum hydrocarbon residua, hydrocarbon streams derived from tar sands, and hydrocarbon streams derived from coal. The most common metals found in such hydrocarbon streams are nickel, vanadium, and iron. Such metals are very harmful to various petroleum refining operations, such as hydrocracking, hydrodesulfurization, and catalytic cracking. The metals and asphaltenes cause interstitial plugging of the catalyst bed and reduced catalyst life. The various metal deposits on a catalyst tend to poison or deactivate the catalyst. Moreover, the asphaltenes tend to reduce the susceptibility of the hydrocarbons to desulfurization. If a catalyst, such as desulfurization catalyst or a fluidized cracking catalyst, is exposed to a hydrocarbon fraction that contains metals and asphaltenes, the catalyst will become deactivated rapidly and will be subject to premature removal from the particular reactor and replacement by new catalyst.

Although processes for the hydrotreating of heavy hydrocarbon streams, including but not limited to heavy crudes, reduced crudes, and petroleum hydrocarbon residua, are known, the use of fixed-bed catalytic processes to convert such feedstocks without appreciable asphaltene precipitation and reactor plugging and with effective removal of metals and other contaminants, such as sulfur compounds and nitrogen compounds, are not too common. While the heavy portions of hydrocarbon streams once could be used as a low-quality fuel or as a source of asphaltic-type materials, the politics and economics of today require that such material be hydrotreated to remove environmental hazards therefrom and to obtain a greater proportion of usable products from such feeds.

It is well known that petroleum hydrocarbon streams can be hydrotreated, i.e., hydrodesulfurized, hydrodenitrogenated, and/or hydrocracked, in the presence of a catalyst comprising a hydrogenating component and a suitable support material, such as an alumina, an alumina-silica, or silica-alumina. The hydrogenating comonent comprises one or more metals from Group VI and/or Group VIII of the Periodic Table of Elements, such as the Periodic Table presented on page 628 of WEBSTER'S SEVENTH NEW COLLEGIATE DICTIONARY, G. & C. Merriam Company, Springfield, Mass., U.S. (1963). Such combinations of metals as cobalt and molybdenum, nickel and molybdenum, cobalt, nickel, and molybdenum, and nickel and tungsten have been found useful. For example, U.S. Pat. No. 3,340,180 teaches that heavy hydrocarbon streams containing sulfur, asphaltic materials, and metalliferous compounds as contaminants can be hydrotreated in the presence of a catalyst comprising such metal combinations and an activated alumina having less than 5% of its pore volume that is in the form of pores having a radius of 0 Angstrom units (Å) to 300 Å in pores larger than 100 Å radius and having less than 10% of said pore volume in pores larger than 80 Å radius.

U.S. Pat. No. 4,016,067 discloses that heavy hydrocarbon streams can be demetalated and desulfurized in a dual catalyst system in which the first catalyst comprises a Group VI metal and a Group VIII metal, preferably molybdenum and cobalt, composited with an alumina support having a demonstratable content of delta and/or theta alumina and has at least 60% of its pore volume in pores having a diameter of about 100 Å to 200 Å, at least about 5% of its pore volume in pores greater than 500 Å in diameter, and a surface area of up to about 110 square meters per gram ($m^2$/gm) and in which the second catalyst comprises a similar hydrogenating component composited with a refractory base, preferably alumina, and has at least 50%, and preferably at least 60%, of its pore volume contributed by pores that have a diameter of 30 Å to 100 Å and a surface area of at least 150 $m^2$/gm.

U.S. Pat. No. 2,890,162 teaches that catalysts comprising active catalytic components on alumina and having a most frequent pore diameter of 60 Å to 400 Å and pores which may have diameters in excess of 1,000 Å are suitable for desulfurization, hydrocracking, hydroforming of naphthene hydrocarbons, alkylation, reforming of naphthas, isomerization of paraffins and the like, hydrogenation, dehydrogenation, and various types of hydrofining operations, and hydrocracking of residua and other asphalt-containing materials. It is suggested that suitable active components and promoters comprise a metal or a catalytic compound of various metals, molybdenum and chromium being among 35 listed metals.

United Kingdom Pat. No. 1,051,341 discloses a process for the hydrodealkylation of certain aromatics, which process employs a catalyst consisting of the oxides or sulfides of a Group VI metal supported on alumina, having a porosity of 0.5 milliliters per gram (ml/gm) to 1.8 ml/gm and a surface area of 138 $m^2$/gm to 200 $m^2$/gm, at least 85% of the total porosity being due to pores having a diameter of 150 Å to 550 Å.

U.S. Pat. Nos. 3,245,919 and 3,267,025 disclose hydrocarbon conversion processes, such as reforming, hydrocracking, hydrodesulfurization, isomerization, hydrogenation, and dehydrogenation, that employ a catalyst of a catalytic amount of a metal component selected from metals of Group VI and Group VIII, such as chromium, molybdenum, tungsten, iron, nickel, cobalt, and the platinum group meals, their compounds, and mixtures thereof, supported on gamma-alumina obtained by the drying and calcining of a boehmite alumina product and having a pore structure totalling at least about 0.5 cc/gm in pores larger than 80 Å in size.

U.S. Pat. No. 3,630,888 teaches the treatment of residuum hydrocarbon feeds in the presence of a catalyst comprising a promoter selected from the group consisting of the elements of Group VIB and Group VIII of the Periodic Table, oxides thereof, and combinations thereof, and a particulate catalytic agent of silica, alumina, and combinations thereof, having a total pore volume greater than 0.40 cubic centimeters per gram (cc/gm), which pore volume comprises micropores and access channels, the access channels being interstitially spaced through the structure of the micropores, a first portion of the access channels having diameters between about 100 Å and about 1,000 Å, which first portion comprises 10% to 40% of the pore volume, a second portion of the access channels having diameters greater than 1,000 Å, which second portion comprises 10% to 40% of the pore volume, and the remainder of the pore volume being micropores having diameters of less than 100 Å, which remainder comprises 20% to 80% of the total pore volume.

U.S. Pat. No. 3,114,701, while pointing out that in hydrofining processes nitrogen compounds are removed from petroleum hydrocarbons in the presence of various catalysts generally comprising chromium and/or molybdenum oxides together with iron, cobalt, and/or nickel oxides on a porous oxide support, such as alumina or silica-alumina, discloses a hydrodenitrification process employing a catalyst containing large concentrations of nickel and molybdenum on a predominantly alumina carrier to treat hydrocarbon streams boiling at 180° F. to about 1,050° F.

U.S. Pat. No. 2,843,552 discloses that a catalyst containing chromina in an appreciable amount with alumina provides a very good attrition resistant catalyst, can have molybdenum oxide impregnated thereon, and can be used in reforming, desulfurization, and isomerization processes.

U.S. Pat. No. 2,577,823 teaches that hydrodesulfurization of heavy hydrocarbon fractions containing from 1% to 6.5% sulfur in the form of organic sulfur compounds, such as a reduced crude, can be conducted over a catalyst of chromium, molybdenum, and aluminum oxides, which catalyst is prepared by simultaneously precipitating the oxides of chromium and molybdenum on a preformed alumina slurry at a pH of 6 to 8.

U.S. Pat. No. 3,265,615 discloses a method for preparing a supported catalyst in which a catalyst carrier of high surface area, such as alumina, is impregnated with ammonium molybdate and then immersed in an aqueous solution of chromic sulfate, and the treated carrier is dried overnight and subsequently reduced by treatment with hydrogen at the following sequential temperatures; 550° F. for ½ hour; 750° F. for ½ hour; and 950° F. for ½ hour. The reduced material is sulfided and employed to hydrofine a heavy gas oil boiling from 650° F. to 930° F.

U.S. Pat. No. 3,956,105 discloses a process for hydrotreating petroleum hydrocarbon fractions, such as residual fuel oils, which process employs a catalyst comprising a Group VIB metal (chromium, molybdenum, tungsten), a Group VIII metal (nickel, cobalt) and a refractory inorganic oxide, which can be alumina, silica, zirconia, thoria, boria, chromia, magnesia, and composites thereof. The catalyst is prepaed by dry mixing a finely divided Group VIB metal compound, a Group VIII metal compound, and a refractory inorganic oxide, peptizing the mixture and forming an extrudable dough, extruding, and calcining.

U.S. Pat. No. 3,640,817 discloses a two-stage process for treating asphaltene-containing hydrocarbons. Both catalysts in the process comprise one or more metallic components selected from the group consisting of molybedenum, tungsten, chromium, iron, cobalt, nickel, and the platinum group metals on a porous carrier material, such as alumina, silica, zirconia, magnesia, titania, and mixtures thereof, the first catalyst having more than 50% of its macropore volume characterized by pores having a pore diameter that is greater than about 1,000 Å and the second catalyst having less than 50% of its macropore volume characterized by pores having a pore diameter that is greater than about 1,000 Å.

U.S. Pat. No. 3,957,622 teaches a two-stage hydroconversion process for treating asphaltene-containing black oils. Desulfurization occurs in the first stage over a catalyst that has less than 50% of its macropore volume characterized by pores having a pore diameter greater than about 1,000 Å. Accelerated conversion and desulfurization of the asphaltenic portion occur in the second stage over a catalyst having more than 50% of its macropore volume characterized by pores having a pore diameter that is greater than 1,000 Å. Each catalyst comprises one or more metallic components selected from the group consisting of molybdenum, tungsten, chromium, iron, cobalt, nickel, the platinum group metals, and mixtures thereof on a support material of alumina, silica, zirconia, magnesia, titania, boris, strontia, hafnia, or mixtures thereof.

French Pat. No. 2,281,972 teaches the preparation of a catalyst comprising the oxides of cobalt, molybdenum, and/or nickel on a base of aluminum oxide and 3 to 15 wt.% chromium oxide and its use for the refining of hydrocarbon fractions, preferably for the hydrodesulfurization of fuel oils obtained by vacuum distillation of residual oils obtained by atmospheric distillation. The base can be prepared by co-precipitation of compounds of chromium and alumina.

U.S. Pat. No. 3,162,596 teaches that, in an integrated process, a residual hydrocarbon oil containing metal contaminants (nickel and vanadium) is first hydrogenated either with a hydrogen donor diluent or over a catalyst having one or more hydrogenation promoting metals supported on a solid carrier exemplified by alumina or silica and then vacuum distilled to separate a heavy gas oil fraction containing reduced quantities of metals from an undistilled residue boiling primarily above about 1,100° F. and containing asphaltic material. The heavy gas oil fraction is subsequently catalytically cracked.

U.S. Pat. No. 3,180,820 discloses that a heavy hydrocarbon stock can be upgraded in a two-zone hydrodesulfurization process, wherein each zone employs a solid hydrogenation catalyst comprising one or more metals from Groups VB, VIB, and VIII of the Periodic Table of Elements. Either catalyst can be supported or unsupported. In a preferred embodiment, the first zone contains an unsupported catalyst-oil slurry and the second zone contains a supported catalyst in a fixed bed, slurry, or fluidized bed. The support of the supported catalyst is a porous refractory inorganic oxide carrier, including alumina, silica, zirconia, magnesia, titania, thoria, boria, strontia, hafnia, and complexes of two or more oxides, such as silica-alumina, silica-zirconia, silica-magnesia, alumina-titania, and silica-magnesia-zirconia, among others. The patent provides that the supported catalyst which is appropriate for use in the invention will have a surface area of about 50 m$^2$/gm to 700 m$^2$/gm, a pore diameter of about 20 Å to 600 Å, and a pore volume of about 0.10 ml/gm to 20 ml/gm.

U.S. Pat. Nos. 3,977,961 and 3,985,684 disclose processes for the hydroconversion of heavy crudes and residua, which processes employ one or two catalysts, each of which comprises a Group VIB metal and/or a Group VIII metal on a refractory inorganic oxide, such as alumina, silica, zirconia, magnesia, boria, phosphate, titania, ceria, and thoria, can comprise a Group IVA metal, such as germanium, has a very high surface area and contains ultra-high pore volume. The first catalyst has at least about 20% of its total pore volume of absolute diameter within the range of about 100 Å to about 200 Å, when the catalyst has a particle size diameter ranging up to 1/50 inch, at least about 15% of its total pore volume of absolute diameter within the range of about 150 Å to about 250 Å, when the catalyst has a particle size diameter ranging from about 1/50 inch to about 1/25 inch, at least about 15% of its total pore volume of absolute diameter within the range of about 175 Å to about 275 Å, when the catalyst has an average particle size diameter ranging from about 1/25 inch to about ⅛ inch, a surface area of about 200 m$^2$/gm to about 600 m$^2$/gm, and a pore volume of about 0.8 cc/gm to about 3.0 cc/gm. The second catalyst has at least about 55% of its total pore volume of absolute diameter within the range of about 100 Å to about 200 Å, less than 10% of its pore volume with pore diameters of 50 Å−, less than about 25% of its total pore volume with pore diameters of 300 Å+, a surface area of about 200 m$^2$/gm to about 600 m$^2$/gm, and a pore volume of about 0.6 cc/gm to about 1.5 cc/gm. These patents teach also that the effluent from such processes may be sent to a catalytic cracking unit or a hydrocracking unit.

U.S. Pat. No. 4,054,508 discloses a process for demetallization and desulfurization of residual oil fractions, which process utilizes 2 catalysts in 3 zones. The oil is contacted in the first zone with a major portion of a first catalyst comprising a Group VIB metal and an iron group metal oxide composited with an alumina support, the first catalyst having at least 60% of its pore volume in pores of 100 Å to 200 Å diameter and at least about 5% of its pore volume in pores having a diameter greater than 500 Å, in the second zone with the second catalyst comprising a Group VIB metal and an iron group metal oxide composited with an alumina support, the second catalyst having a surface area of at least 150 m$^2$/gm and at least 50% of its pore volume in pores with diameters of 30 Å to 100 Å, and then in a third zone with a minor portion of the first catalyst.

Now there has been found and developed a process for hydrotreating a heavy hydrocarbon stream containing metals, asphaltenes, nitrogen compounds, and sulfur compounds, which process employs a catalyst that has special physical characteristics and a hydrogenating component containing molybdenum and chromium.

SUMMARY OF THE INVENTION

Broadly, according to the present invention, there is provided a process for the hydrotreating of a heavy hydrocarbon stream containing metals, asphaltenes, nitrogen compounds, and sulfur compounds, which process comprises contacting said stream under suitable conditions and in the presence of hydrogen with a catalyst comprising a hydrogenating component consisting essentially of a member selected from the group consisting of (1) molybdenum and chromium, (2) their oxides, (3) their sulfides, and (4) mixtures thereof on a large-pore, catalytically active alumina. The molybdenum can be present in an amount within the range of about 5 wt.% to about 15 wt.%, calculated as $MoO_3$ and based upon the total catalyst weight, and the chromium can be present in an amount within the range of about 5 wt.% to about 20 wt.%, calculated as $Cr_2O_3$ and based upon the total catalyst weight. The catalyst possesses a pore volume within the range of about 0.4 cc/gm to about 0.8 cc/gm, a surface area within the range of about 150 m$^2$/gm to about 300 m$^2$/gm, and an average pore diameter within the range of about 100 Å to about 200 Å.

The catalyst that is employed in the process of the present invention can be prepared by calcining the alumina (pseudo-boehmite) in air at a temperature of about 800° F. to about 1,400° F. for a period of time within the range of about ½ to about 2 hours to produce a gamma-alumina and subsequently impregnating the gamma-alumina with one or more aqueous solutions containing heat-decomposable salts of the molybdenum and the chromium.

The catalyst that is employed in the process of the present invention has about 0% to about 10% of its pore volume in pores having diameters that are smaller than 50 Å, about 30% to about 80% of its pore volume in pores having diameters within the range of about 50 Å to about 100 Å, about 10% to about 50% of its pore volume in pores having diameters within the range of about 100 Å to about 150 Å, and about 0% to about 10% of its pore volume in pores having diameters that are larger than 150 Å.

The process of the present invention is carried out at a hydrogen partial pressure within the range of about 1,000 psia to about 3,000 psia, an average catalyst bed temperature within the range of about 700° F. to about 820° F., a liquid hourly space velocity (LHSV) within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 standard cubic feet of hydrogen per barrel of hydrocarbon (SCFB) to about 15,000 SCFB.

DETAILED DESCRIPTION OF THE INVENTION

Figure 1:
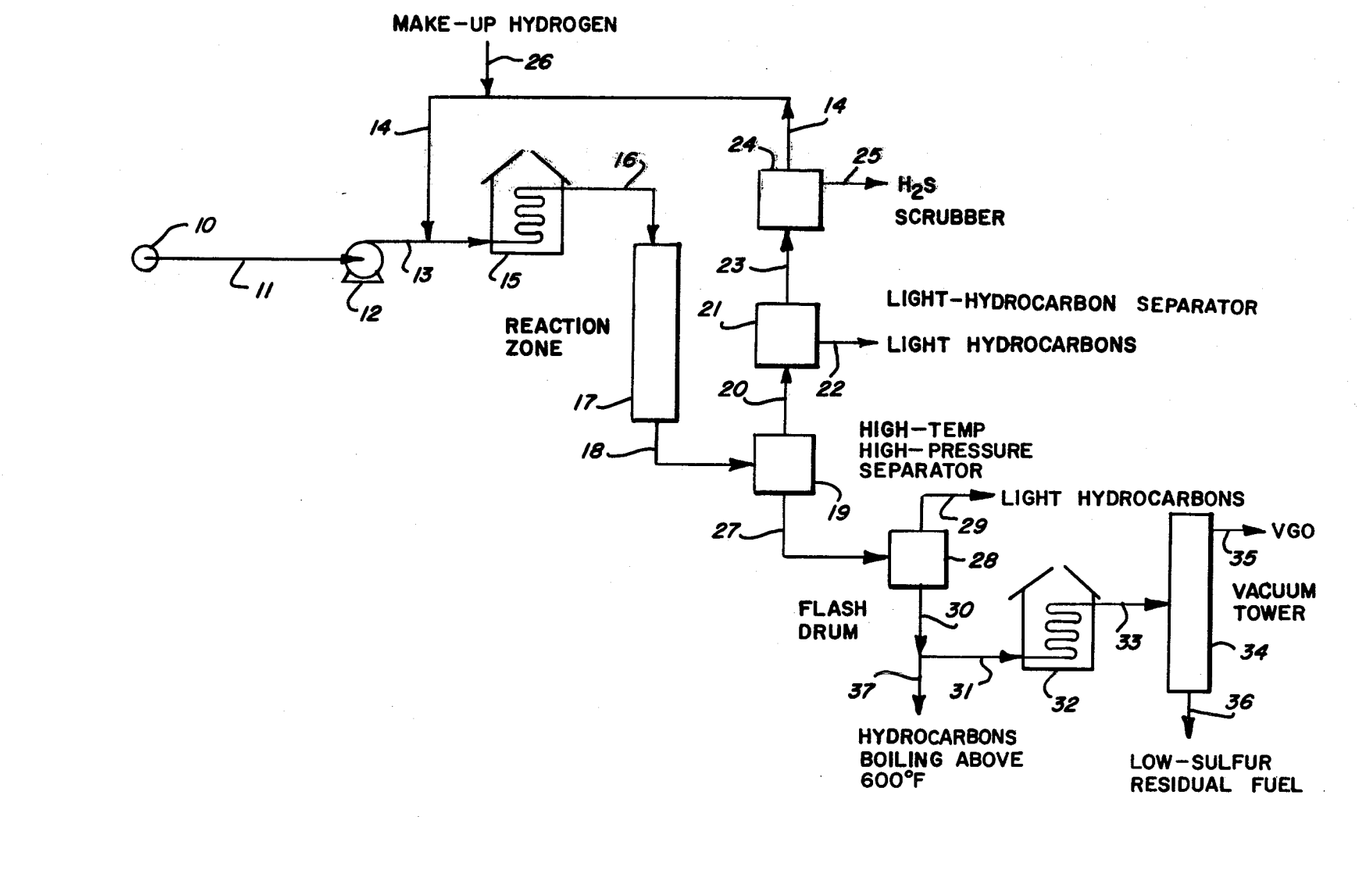
The accompanying FIGURE is a simplified flow diagram of a preferred embodiment of the process of the present invention.

The present invention is directed to a novel process for the hydrotreating of heavy hydrocarbon feedstocks. Such feedstocks will contain asphaltenes, metals, nitrogen compounds, and sulfur compounds. It is to be understood that the feedstocks that are to be treated by the process of the present invention will contain from a small amount of nickel and vanadium, e.g., less than 40 ppm, up to more than 1,000 ppm of nickel and vanadium (a combined total amount of nickel and vanadium) and up to about 25 wt.% asphaltenes. If the feedstock contains either a combined amount of nickel and vanadium that is too large or an amount of asphaltenes that is exceptionally large, the feedstock can be subjected to a preliminary treatment to reduce the excessive amount of the particular contaminant. Such preliminary treatment will comprise a suitable hydrogenation treatment for the removal of metals from the feedstock and/or the conversion of asphaltenes in the feedstock to reduce the contaminants to satisfactory levels, such treatment employing any suitable relatively cheap catalyst. The above-mentioned contaminants will deleteriously affect the subsequent processing of such feedstocks, if they are not lowered to acceptable levels.

Typical feedstocks that can be treated satisfactorily by the process of the present invention will often contain a substantial amount of components that boil appreciably above 1,000° F. Examples of typical feedstocks are crude oils, topped crude oils, petroleum hydrocarbon residua, both atmospheric and vacuum residua, oils obtained from tar sands and residua derived from tar sand oil, and hydrocarbon streams derived from coal. Such hydrocarbon streams contain organometallic contaminants which create deleterious effects in various refining processes that employ catalysts in the conversion of the particular hydrocarbon stream being treated. The metallic contaminants that are found in such feedstocks include, but are not limited to, iron, vanadium, and nickel.

Nickel is present in the form of soluble organometallic compounds in most crude oils and residuum fractions. The presence of nickel porphyrin complexes and other nickel organometallic complexes causes severe difficulties in the refining and utilization of heavy hydrocarbon fractions, even if the concentration of such complexes is relatively small. It is known that a cracking catalyst deteriorates rapidly and its selectivity changes when in the presence of an appreciable quantity of the organometallic nickel compounds. An appreciable quantity of such organometallic nickel compounds in feedstocks that are being hydrotreated or hydrocracked harmfully affects such processes. The catalyst becomes deactivated and plugging or increasing of the pressure drop in a fixed-bed reactor results from the deposition of nickel compounds in the interstices between catalyst particles.

Iron-containing compounds and vanadium-containing compounds are present in practically all crude oils that are associated with the high Conradson carbon asphaltic and/or asphaltenic portion of the crude. Of course, such metals are concentrated in the residual bottoms, when a crude is topped to remove those fractions that boil below about 450° F. to 600° F. If such residuum is treated by additional processes, the presence of such metals adversely affects the catalyst in such processes. It should be pointed out that nickel-containing compounds deleteriously affect cracking catalysts to a greater extent than do iron-containing compounds. If an oil containing such metals is used as a fuel, the metals will cause poor fuel oil performance in industrial furnaces, since they corrode the metal surfaces of the furnaces.

While metallic contaminants, such as vanadium, nickel, and iron, are often present in various hydrocarbon streams in rather small amounts, they are often found in concentrations in excess of 40 to 50 ppm by weight, often in excess of 1,000 ppm. Of course, other metals are also present in a particular hydrocarbon stream. Such metals exist as the oxides or sulfides of the particular metal, or they are present as a soluble salt of the particular metal, or they are present as high molecular weight organometallic compounds, including metal naphthenates and metal porphyrins, and derivatives thereof. In any event, the feed stream can be treated for demetallization prior to use in the process of the present invention if the total amount of nickel and vanadium is excessive.

Broadly, according to the process of the present invention, there is provided a process for hydrotreating a heavy hydrocarbon stream containing metals, asphaltenes, nitrogen compounds, and sulfur compounds, which process comprises contacting said stream under suitable conditions and in the presence of hydrogen with a catalyst comprising a hydrogenating component consisting essentially of a member selected from the group consisting of (1) molybdenum and chromium, (2) their oxides, (3) their sulfides, and (4) mixtures thereof on a large-pore, catalytically active alumina, said molybdenum being present in an amount within the range of about 5 wt.% to about 15 wt.%, calculated as $MoO_3$ and based upon the total catalyst weight, said chromium being present in an amount within the range of about 5 wt.% to about 20 wt.%, calculated as $Cr_2O_3$ and based upon the total catalyst weight, and said catalyst having a pore volume within the range of about 0.4 cc/gm to about 0.8 cc/gm, a surface area within the range of about 150 m²/gm to about 300 m²/gm, and an average pore diameter within the range of about 100 Å to about 200 Å.

It is to be understood that as used herein all values that are given for surface area would be those that are obtained by the BET nitrogen adsorption method; all values that are given for pore volume would be those that are obtained by nitrogen adsorption; and all values that are given for average pore diameter would be those that are calculated by means of the expression:

$$A.P.D. = (4 \times P.V. \times 10^4 / S.A.),$$

wherein
A.P.D. = average pore diameter in Å,
P.V. = pore volume in cc/gm, and
S.A. = surface area in m²/gm.

Furthermore, pore size distributions are those that are obtained by a Digisorb 2500 instrument through the use of nitrogen desorption techniques.

In the process of the present invention, the catalyst provides good demetallization activity, moderate desulfurization activity, and possesses good stability to deactivation, when being used at a high temperature and/or moderate pressure, such as about 1,200 psig.

The hydrogenating component of the catalyst that is employed in the process of the present invention is a particular component made up of molybdenum and chromium. The molybdenum and chromium are present in the elemental form, as oxides of the metals, as sulfides of the metals, or mixtures thereof. The molybdenum is present in an amount within the range of about 5 wt.% to about 15 wt.%, calculated as $MoO_3$ and based upon the total catalyst weight. The chromium is present in an amount within the range of about 5 wt.% to about 20 wt.%, calculated as $Cr_2O_3$ and based upon the total catalyst weight. Preferably, the molybdenum is present in an amount within the range of about 7 wt.% to about 13 wt.%, calculated as $MoO_3$ and based upon the total catalyst weight, and the chromium is present in an amount within the range of about 6 wt.% to about 15 wt.%, calculated as $Cr_2O_3$ and based upon the total catalyst weight.

Suitable catalytically active large-pore aluminas are employed in the catalyst that is utilized in the process of the present invention. A typical example of such an alumina is Aero-100 alumina, manufactured by the American Cyanamid Company. The alumina should have a pore volume that is in excess of 0.4 cc/gm, a surface area that is in excess of 150 $m^2$/gm, and an average pore diameter that is greater than 100 Å.

Typically, the catalytic composition that is employed in the process of the present invention may be prepared by impregnating the various metals upon the suitable catalytically active large-pore alumina. Such impregnation may be accomplished with one or more solutions of heat-decomposable compounds of the appropriate metals. The impregnation may be a co-impregnation when a single solution of the metals is employed. Alternatively, impregnation may be accomplished by the sequential impregnation of the various metals from two or more solutions of the heat-decomposable compounds of the appropriate metals. The impregnated support is dried at a temperature of at least 250° F. for a period of at least 1 hour and calcined in air at a temperature of at least 1,000° F. for a period of time of at least 2 hours. Preferably, the catalyst that is used in the process of the present invention is prepared by first calcining pseudo-boehmite in static air at a temperature of about 800° F. to about 1,400° F. for a period of time within the range of about ½ hour to about 2 hours to produce a gamma-alumina. This gamma-alumina is subsequently impregnated with the aqueous solution or solutions containing the heat-decomposable salts of the molybdenum and chromium.

The finished catalyst that is employed in the process of the present invention possesses a pore volume within the range of about 0.4 cc/gm to about 0.8 cc/gm, a surface area within the range of about 150 $m^2$/gm to about 300 $m^2$/gm, and an average pore diameter within the range of about 100 Å to about 200 Å. Preferably, the catalyst possesses a pore volume within the range of about 0.5 cc/gm to about 0.7 cc/gm, a surface area within the range of about 150 $m^2$/gm to about 250 $m^2$/gm, and an average pore diameter within the range of about 110 Å to about 150 Å.

The catalyst employed in the process of the present invention should have about 0% to about 10% of its pore volume in pores having diameters that are smaller than 50 Å, about 30% to about 80% of its pore volume in pores having diameters within the range of about 50 Å to about 100 Å, about 10% to about 50% of its pore volume in pores having diameters within the range of about 100 Å to about 150 Å, and about 0% to about 10% of its pore volume in pores having diameters that are larger than 150 Å.

The process of the subject application is particularly useful for hydrotreating heavy hydrocarbon streams such as petroleum residua, both atmospheric resids and vacuum resids, tar sands oils, tar sands resids, and liquids obtained from coal. In addition, the process may be employed to satisfactorily hydrotreat petroleum hydrocarbon distillates, such as gas oils, cycle stocks, and furnace oils. If the amount of nickel and vanadium is excessive or the concentration of asphaltenes is too large, the feed stock should be subjected to a preliminary treatment to reduce the excessive amount or amounts to more tolerable levels before the feedstock is used in the process of the present invention.

Operating conditions for the hydrotreatment of heavy hydrocarbon streams, such as petroleum hydrocarbon residua and the like, comprise a hydrogen partial pressure within the range of about 1,000 psia to about 3,000 psia, an average catalyst bed temperature within the range of about 700° F. to about 820° F., a LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB to about 15,000 SCFB. Preferably, the operating conditions comprise a hydrogen partial pressure within the range of about 1,200 psia to about 2,000 psia, an average catalyst bed temperature within the range of about 730° F. to about 810° F., a LHSV within the range of about 0.4 to about 1, and a hydrogen recycle rate or hydrogen addition rate within the range of about 5,000 SCFB to about 10,000 SCFB.

If the process of the present invention were to be used to treat hydrocarbon distillates, the operating conditions would comprise a hydrogen partial pressure within the range of about 200 psia to about 3,000 psia, an average catalyst bed temperature within the range of about 600° F. to about 800° F., a LHSV within the range of about 0.4 volume of hydrocarbon per hour per volume of catalyst to about 6 volumes of hydrocarbon per hour per volume of catalyst, and a hydrogen recycle rate or hydrogen addition rate within the range of about 1,000 SCFB to about 10,000 SCFB. Preferred operating conditions for the hydrotreating of hydrocarbon distillates comprise a hydrogen partial pressure within the range of about 200 psia to about 1,200 psia, an average catalyst bed temperature within the range of about 600° F. to about 750° F., a LHSV within the range of about 0.5 volume of hydrocarbon per hour per volume of catalyst to about 4 volumes of hydrocarbon per hour per volume of catalyst, and a hydrogen recycle rate or hydrogen addition rate within the range of about 1,000 SCFB to about 6,000 SCFB.

A preferred embodiment of the process of the present invention is presented in the accompanying FIGURE, which is a simplified flow diagram and does not show various pieces of auxiliary equipment, such as pumps, compressors, heat exchangers, and valves. Since one having ordinary skill in the art would recognize easily the need for and location of such auxiliary equipment, its omission is appropriate and facilitates the simplification of the FIGURE. This process scheme is presented for the purpose of illustration only and is not intended to limit the scope of the present invention.

Referring to the FIGURE, an Arabian light vacuum resid, containing about 4 wt.% sulfur, less than 0.5 wt.% nitrogen, and less than 100 ppm of nickel and vanadium, is withdrawn from source 10 through line 11 into pump 12, whereby it is pumped through line 13. A hydrogen-containing recycle gas stream, discussed hereinafter, is passed from line 14 into line 13 to be mixed with the hydrocarbon feed stream to form a mixed hydrogen-hydrocarbon stream. The mixed hydrogen-hydrocarbon stream is then passed from line 13 into furnace 15 where it is heated to a temperature within the range of about 760° F. to about 780° F. The heated stream is then passed through line 16 into reaction zone 17.

Reaction zone 17 comprises one or more reactors, each of which contains one or more fixed beds of catalyst. The catalyst comprises a hydrogenation component consisting essentially of about 5 wt.% to about 15 wt.% molybdenum, calculated as $MoO_3$ and based upon the total catalyst weight, and about 5 wt.% to about 20 wt.% chromium, calculated as $Cr_2O_3$ and based upon the total catalyst weight, on a large-pore, catalytically active alumina. The molybdenum and the chromium are present either in the elemental form, as oxides of the metals, as sulfides of the metals, or as mixtures thereof. The catalyst has a pore volume within the range of about 0.4 cc/gm to about 0.8 cc/gm, a surface area within the range of about 150 m²/gm to about 300 m²/gm, an average pore diameter within the range of about 100 Å to about 200 Å, and a pore-size distribution wherein about 0% to about 10% of the pore volume has pore diameters within the range of about 0 Å to about 50 Å, about 30% to about 80% of the pore volume has pore diameters within the range of about 50 Å to about 100 Å, about 10% to about 50% of the pore volume has pore diameters within the range of about 100 Å to about 150 Å, and about 0% to about 10% of the pore volume has pore diameters that are larger than 150 Å.

The operating conditions employed in this scheme comprise a hydrogen partial pressure of about 1,200 psia to about 1,600 psia, an average catalyst bed temperature within the range of about 760° F. to about 780° F., an LHSV within the range of about 0.4 volume of hydrocarbon per hour per volume of catalyst to about 0.8 volume of hydrocarbon per hour per volume of catalyst, and a hydrogen recycle rate within the range of about 5,000 SCFB to about 8,000 SCFB.

The effluent from reaction zone 17 is passed through line 18 into high-temperature, high-pressure, gas-liquid separator 19, which is operated at reactor pressure and a temperature within the range of about 760° F. to about 780° F. In separator 19, hydrogen-containing gas is separated from the rest of the effluent. The hydrogen-containing gas is passed from separator 19 through line 20. It is cooled and sent into light-hydrocarbon separator 21, wherein the condensed light hydrocarbons are separated from the hydrogen-containing gas and withdrawn via line 22. The hydrogen-containing gas is removed by way of line 23 and passed into scrubber 24, wherein the hydrogen sulfide is removed or scrubbed from the gas. The hydrogen sulfide is removed from the system by way of line 25. The scrubbed hydrogen-containing gas is then passed through line 14 where it can be joined by make-up hydrogen, if necessary, via line 26. The hydrogen-containing gas stream is then added to the hydrocarbon feed stream in line 13, as described hereinabove.

The liquid portion of the effluent is passed from the high-temperature, high-pressure, gas-liquid separator 19 by way of line 27 to high-temperature flash drum 28. In flash drum 28, the pressure is reduced to atmospheric pressure and the temperature of the material is within the range of about 700° F. to about 800° F. In flash drum 28, the light hydrocarbons containing not only the naphtha but those distillates boiling up to a temperature of about 550° F. to 600° F., such as fuel oils, is flashed from the rest of the product and is removed from the system by way of line 29. Such light hydrocarbons, which comprise about 1 wt.% to about 4 wt.% $C_4$-material, about 2 wt.% to 5 wt.% naphtha ($C_5$-to-360° F. material), and about 10 wt.% to 15 wt.% 360° F.–650° F. material, based upon hydrocarbon feed, can be separated into their various components and sent to storage or to other processing units.

The heavier material that is separated from the light hydrocarbons, that is, material that boils at a temperature above about 600° F., present in an amount of about 60 wt.% to about 90 wt.% based upon the hydrocarbon feed, is removed from flash drum 28 by way of line 30 for use as feeds to other processes or as a low-sulfur, heavy industrial fuel. Such liquid material contains about 0.6 wt.% to about 1.2 wt.% sulfur, about 1.0 wt.% to about 3.0 wt.% asphaltenes, and about 5 ppm to about 15 ppm nickel and vanadium. Furthermore, more than 50% of the 1,000° F.+ material is converted to 1,000° F.− material.

This liquid effluent is passed via line 31 to furnace 32, or other suitable heating means, to be heated to a temperature as high as 800° F.

The heated stream from furnace 32 is passed by way of line 33 into vacuum tower 34, where vacuum gas oil (VGO) is separated from a low-sulfur residual fuel. The VGO is passed from vacuum tower 34 by way of line 35 to storage or to a conventional catalytic cracking unit (not shown). The low-sulfur residual fuel is passed from vacuum tower 34 by way of line 36 to storage or to other processing units where it can be used as a source of energy.

Alternatively, the material boiling above 600° F. that is removed from flash drum 28 through line 30 can be sent by way of line 37 to a resid catalytic cracking unit (not shown).

The following examples are presented to facilitate the understanding of the present invention and are presented for the purposes of illustration only and are not intended to limit the scope of the present invention.

EXAMPLE 1

A catalyst, hereinafter identified as Catalyst A, was prepared to contain 8.3 wt.% $MoO_3$ and 8.3 wt.% $Cr_2O_3$, based upon the total catalyst weight, on a large-pore, catalytically active alumina. A 40.8-gram sample of Aero-100 alumina, obtained from the American Cyanamid Company, was impregnated with a solution containing ammonium dichromate and ammonium molybdate. The Aero-100 alumina was in the form of 14-to-20-mesh material and had been previously calcined at a temperature of about 1,200° F. in air for a period of 2 hours.

The solution that was used for the impregnation was prepared by dissolving 6.8 grams of the ammonium dichromate and 5.3 grams of the ammonium molybdate in 40 milliliters of distilled water.

The impregnated alumina was dried under a heat lamp in static air overnight to remove the excess water. The dried material was then calcined in static air at a temperature of 1,000° F. for a period of 2 hours. This finished catalyst, Catalyst A, is an embodiment of the catalyst that is employed in the process of the present invention.

EXAMPLE 2

For comparative purposes, a commercially-available catalyst was obtained from the American Cyanamid Company. This commercial catalyst was identified as HDS-2A and was specified by the American Cyanamid Company to contain 3 wt.% CoO and 13 wt.% $MoO_3$ on an alumina support. This catalyst is identified hereinafter as Catalyst B.

The physical properties of Catalyst A and Catalyst B are presented in the following Table I.

EXAMPLE 3

A second hydrotreating catalyst was employed for comparative purposes. This catalyst was obtained from the Nalco Chemical Company. The catalyst, identified hereinafter as Catalyst C, was specified to contain about 3 wt.% CoO and 13 wt.% $MoO_3$ on an alumina support. The properties of Catalysts A, B and C are presented hereinbelow in Table I.

TABLE I

| CATALYST | CATALYST PROPERTIES | | | | | | |
|---|---|---|---|---|---|---|---|
| | A | B | C | D | E | F | G |
| HYDROGENATION COMPONENT, WT.% | | | | | | | |
| CoO | — | 3 | 3 | — | — | — | — |
| $Cr_2O_3$ | 8.3 | — | — | — | — | 5.2 | 15.4 |
| $MoO_3$ | 8.3 | 13 | 13 | — | 9 | 8.6 | 7.7 |
| PHYSICAL PROPERTIES | | | | | | | |
| SURFACE AREA, $m^2$/gm | 208 | 330 | 284 | 222 | 201 | 197 | 198 |
| PORE VOLUME, cc/gm | 0.60 | 0.61 | 0.61 | 0.73 | 0.66 | 0.60 | 0.59 |
| AVG. PORE DIAM., A | 116 | 73 | 86 | 131 | 130 | 122 | 119 |
| % OF PORE VOLUME IN: | | | | | | | |
| 0-50 A PORES | 6.3 | 26.7 | 14.2 | 1.4 | 3.1 | 2.2 | 2.7 |
| 50-100 A PORES | 69.5 | 58.8 | 76.3 | 56.7 | 68.0 | 64.8 | 65.8 |
| 100-150 A PORES | 23.1 | 4.3 | 2.1 | 36.6 | 27.8 | 30.6 | 30.2 |
| 150-200 A PORES | 0.4 | 1.6 | 0.7 | 1.6 | 0.2 | 0.8 | 0.2 |
| 200-300 A PORES | 0.3 | 2.1 | 1.1 | 1.4 | 0.3 | 0.7 | 0.3 |
| 300-400 A PORES | 0.1 | 0.8 | 0.4 | 0.1 | 0.2 | 0.1 | |
| 400 A+ PORES | 0.3 | 5.7 | 4.8 | 1.9 | 0.5 | 0.6 | 0.5 |

TABLE II

| FEED PROPERTIES | |
|---|---|
| Carbon, wt.% | 84.91 |
| Hydrogen, wt.% | 10.61 |
| H/C (atomic) | 1.499 |
| Nitrogen, wt.% | 0.34 |
| Sulfur, wt.% | 4.07 |
| Nickel, ppm | 17.5 |
| Vanadium | 51.1 |
| 1,000° F. - fraction | 13.6 |
| Ramsbottom carbon, wt.% | 15.2 |
| Gravity, API | 8.8 |
| Asphaltenes, wt.% | 8.0 |
| Oils, wt.% | 39.2 |
| Resins, wt.% | 52.8 |
| Resins/asphaltenes | 6.6 |

In addition, the physical properties of the alumina that was used as the support material for Catalyst A are presented in Table I. This support material is identified as Catalyst D. The introduction of the metals into the alumina did not affect appreciably the pore size distribution, pore volume, surface area, or average pore diameter of the alumina.

EXAMPLE 4

Three other catalysts were prepared to show the effect of different concentrations of chromia upon the catalyst which comprises approximately 9 wt.% molybdena and an Aero-100 alumina support. These catalysts were prepared according to the preparation method discussed in Example 1 hereinabove. However, only the appropriate amounts of the metals were used to provide the desired compositions of the finished catalysts. These three catalysts are identified hereinafter as Catalysts E, F, and G and were prepared with the same type of Aero-100 alumina that was used in the preparation of Catalyst A. Their chemical compositions and physical properties are presented also in Table I hereinabove. Again it is seen that the introduction of the metals onto and into the alumina has not greatly affected the physical properties of the alumina.

EXAMPLE 5

Each of the above-discussed catalysts were tested for its ability to convert an Arabian light vacuum resid. Appropriate properties of this feedstock are presented hereinbelow in Table II.

Each test was carried out in a bench-scale test unit having automatic controls for pressure, flow of reactants, and temperature. The reactor was made from ⅜-inch-inside-diameter stainless-steel, heavy-walled tubing. A ⅛-inch-outside-diameter thermowell extended up through the center of the reactor. The reactor was heated by an electrically-heated steel block. The hydrocarbon feedstock was fed to the unit by means of a Ruska pump, a positive displacement pump. The 14-to-20-mesh catalyst material was supported on 8-to-10-mesh alundum particles. Approximately 20 cubic centimeters of catalyst were employed as the catalyst bed in each test. This amount of catalyst provided a catalyst bed length of about 10 inches to about 12 inches. A 10-inch layer of 8-to-10-mesh alundum particles was placed over the catalyst bed in the reactor for each test. The catalyst that was employed was located in the annular space between the thermowell and the internal wall of the ⅜-inch-inside-diameter reactor.

Prior to its use, each catalyst was calcined in still air at a temperature of about 1,000° F. for 1 hour. It was subsequently cooled in a desiccator and loaded into the appropriate reactor.

The catalyst was then subjected to the following pretreatment. The reactor was placed in the reactor block at a temperature of 300° F. A gas mixture containing 8 mole % hydrogen sulfide in hydrogen was passed over the catalyst at the rate of 1 standard cubic foot per hour (SCFH) at a pressure of 500 psig and a temperature of about 300° F. After 10 to 15 minutes of such treatment, the temperature of the block was raised to 400° F. After at least an additional 1 hour of time had elapsed and at least 1 standard cubic foot of gas mixture had passed through the system, the temperature of the block was raised to 700° F. Then the gas mixture was passed through the catalyst bed for at least 1 additional hour and in an amount of at least 1 standard cubic foot. At this point, the gas mixture was discontinued, hydrogen was introduced into the unit at a pressure of 1,200 psig, the flow of hydrogen was established at a rate of about 0.6 SCFH, and the temperature was increased to provide an average catalyst bed temperature of 760° F. Subsequently, the hydrocarbon flow was established at a rate that would provide an LHSV of 0.59 volume of hydrocarbon per hour per volume of catalyst. Effluent from the reaction zone was collected in a liquid product receiver, while the gas that was formed was passed through the product receiver to a pressure control valve and then through a wet test meter to an appropriate vent.

After a period of from 1 to 3 days, the average catalyst bed temperature was increased to 780° F. After an additional amount of time, e.g., about 3 to 5 days, the average catalyst bed temperature was increased to about 800° F.

Selected samples were obtained from the product receiver and were analyzed for pertinent information. Results of the tests are presented hereinbelow in Table III. These data were obtained from samples taken during the fifth to ninth day of operation conducted at an LHSV of 0.59 volume of hydrocarbon per hour per volume of catalyst, a temperature of 800° F., and a pressure of 1,200 psig, unless otherwise indicated.

TABLE III

| | TEST RESULTS | | | | | | |
|---|---|---|---|---|---|---|---|
| Run No. | 1 | 2 | 3 | 4 | 4 | 5 | 6 |
| Catalyst | A | B | C | E | E | F | G |
| Temperature, °F. | 800 | 800 | 780 | 780 | 800 | 800 | 800 |
| Pressure, psig | 1,200 | 1,200 | 1,200 | 1,200 | 1,200 | 1,200 | 1,200 |
| LHSV | 0.59 | 0.59 | 0.59 | 0.59 | 0.59 | 0.59 | 0.59 |
| Hydrogen rate, SCFB | | | | | | | |
| % Sulfur removal | 65.4 | 77.4 | 85 | 59 | 60.5 | 60 | 69.6 |
| % Nickel removal | 85 | 43 | 48 | 40 | 64 | 64 | 78 |
| % Vanadium removal | 92.5 | 94.9 | 57 | 79 | 81 | 87 | 90.6 |
| % Asphaltene conversion | 70 | 68.8 | 54 | 67.5 | 66 | 70 | 71 |
| Liquid gravity, API | 20.1 | 19.9 | 20.4 | 17.5 | 19.3 | 17.6 | 21.1 |
| % Conversion of 1,000° F. + material | 59.1 | 47.3 | 40 | — | 53 | 60.6 | 58.6 |
| Days on Stream | 6 | 7 | 7–18[(1)] | 5 | 9 | 10 | 7 |

[(1)]Composite sample of material obtained from Day 7 through Day 18.

The results presented in Table III demonstrate that the run employing Catalyst A, i.e., an embodiment of the process of the present invention, was superior to the two tests that employed other catalysts. The data show that the process of the present invention provided better nickel removal, about as good vanadium removal, better asphaltene conversion, better conversion of the 1,000° F.+ material, but less sulfur removal than the processes employing the other catalysts. Hence, the process of the present invention is a suitable process for demetallization, desulfurization, asphaltene conversion, and conversion of 1,000° F.+ material, when treating a heavy hydrocarbon stream. Moreover, the data from Runs 1, 4, 5, and 6 show that the presence of the $Cr_2O_3$ in the catalyst promoted better metals removal, sulfur removal, asphaltene conversion, and conversion of 1,000° F.+ material to 1,000° F.− material.

What is claimed is:

1. A process for hydrotreating a heavy hydrocarbon stream containing metals, asphaltenes, nitrogen compounds, and sulfur compounds to reduce the contents of metals, asphaltenes, nitrogen compounds, and sulfur compounds in said stream, which process comprises contacting said stream under suitable conditions and in the presence of hydrogen with a catalyst comprising a hydrogenating component consisting essentially of (1) molybdenum and chromium, (2) their oxides, (3) their sulfides, or (4) mixtures thereof on a large-pore, catalytically active alumina, said molybdenum being present within the range of about 5 wt.% to about 15 wt.%, calculated as $MoO_3$ and based upon the total catalyst weight, said chromium being present in an amount within the range of about 5 wt.% to about 20 wt.%, calculated as $Cr_2O_3$ and based upon the total catalyst weight, and said catalyst having a pore volume within the range of about 0.4 cc/gm to about 0.8 cc/gm, a surface area within the range of about 150 m²/gm to about 300 m²/gm, and an average pore diameter within the range of abbout 100 Å to about 200 Å.

2. The process of claim 1, wherein said catalyst is prepared by sequentially calcining pseudo-boehmite in static air at a temperature of about 800° F. to about 1,400° F. for a period of time within the range of about ½ hour to about 2 hours to produce a gamma-alumina and impregnating said gamma-alumina with one or more aqueous solutions containing heat-decomposable salts of said molybdenum and said chromium.

3. The process of claim 1, wherein the amount of molybdenum present in said catalyst is within the range of about 7 wt.% to about 13 wt.%, calculated as $MoO_3$ and based upon the total catalyst weight, and wherein the amount of chromium in said catalyst is within the range of about 6 wt.% to about 15 wt.%, calculated as $Cr_2O_3$ and based upon the total catalyst weight.

4. The process of claim 1, wherein said catalyst has a pore volume within the range of about 0.5 cc/gm to about 0.7 cc/gm, a surface area within the range of about 150 m²/gm to about 250 m²/gm, and an average pore diameter within the range of about 110 Å to about 150 Å.

5. The process of claim 1, wherein said suitable conditions comprise a hydrogen partial pressure within the range of about 1,000 psia to about 3,000 psia, an average catalyst bed temperature within the range of about 700° F. to about 820° F., an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB to about 15,000 SCFB.

6. The process of claim 1, wherein said catalyst has about 0% to about 10% of its pore volume in pores having diameters that are smaller than 50 Å, about 30% to about 80% of its pore volume in pores having diameters within the range of about 50 Å to about 100 Å, about 10% to about 50% of its pore volume in pores having diameters within the range of about 100 Å to about 150 Å, and about 0% to about 10% of its pore volume in pores having diameters that are larger than 150 Å.

7. The process of claim 2, wherein the amount of molybdenum present in said catalyst is within the range of about 7 wt.% to about 13 wt.%, calculated as $MoO_3$ and based upon the total catalyst weight, and wherein the amount of chromium in said catalyst is within the range of about 6 wt.% to about 15 wt.%, calculated as $Cr_2O_3$ and based upon the total catalyst weight.

8. The process of claim 2, wherein said catalyst has a pore volume within the range of about 0.5 cc/gm to about 0.7 cc/gm, a surface area within the range of about 150 m$^2$/gm to about 250 m$^2$/gm and an average pore diameter within the range of about 110 Å to about 150 Å.

9. The process of claim 2, wherein said suitable conditions comprise a hydrogen partial pressure within the range of about 1,000 psia to about 3,000 psia, an average catalyst bed temperature within the range of about 700° F. to about 820° F., an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB to about 15,000 SCFB.

10. The process of claim 2, wherein said catalyst has about 0% to about 10% of its pore volume in pores having diameters that are smaller than 50 Å, about 30% to about 80% of its pore volume in pores having diameters within the range of about 50 Å to about 100 Å, about 10% to about 50% of its pore volume in pores having diameters within the range of about 100 Å to about 150 Å, and about 0% to about 10% of its pore volume in pores having diameters that are larger than 150 Å.

11. The process of claim 6, wherein the amount of molybdenum present in said catalyst is within the range of about 7 wt.% to about 13 wt.%, calculated as $MoO_3$ and based upon the total catalyst weight, and wherein the amount of chromium in said catalyst is within the range of about 6 wt.% to about 15 wt.%, calculated as $Cr_2O_3$ and based upon the total catalyst weight.

12. The process of claim 6, wherein said catalyst has a pore volume within the range of about 0.5 cc/gm to about 0.7 cc/gm, a surface area within the range of about 150 m$^2$/gm to about 250 m$^2$/gm, and an average pore diameter within the range of about 110 Å to about 150 Å.

13. The process of claim 6, wherein said suitable conditions comprise a hydrogen partial pressure within the range of about 1,000 psia to about 3,000 psia, an average catalyst bed temperature within the range of about 700° F. to about 820° F., an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB to about 15,000 SCFB.

14. The process of claim 7, wherein said catalyst has a pore volume within the range of about 0.5 cc/gm to about 0.7 cc/gm, a surfce area within the range of about 150 m$^2$/gm to about 250 m$^2$/gm, and an average pore diameter within the range of about 110 Å to about 150 Å.

15. The process of claim 7, wherein said suitable conditions comprise a hydrogen partial pressure within the range of about 1,000 psia to about 3,000 psia, an average catalyst bed temperature within the range of about 700° F. to about 820° F., an LHSV within the range of about 0.1 volume of hydrocarbon per hour per volume of catalyst to about 3 volumes of hydrocarbon per hour per volume of catalyst, and a hydrogen recycle rate of hydrogen addition rate within the range of about 2,000 SCFB to about 15,000 SCFB.

16. The process of claim 7, wherein said catalyst has about 0% to about 10% of its pore volume in pores having diameters that are smaller than 50 Å, about 30% to about 80% of its pore volume in pores having diameters within the range of about 50 Å to about 100 Å, about 10% to about 50% of its pore volume in pores having diameters within the range of about 100 Å to about 150 Å, and about 0% to about 10% of its pore volume in pores having diameters that are larger than 150 Å.

17. The process of claim 8, wherein said suitable conditions comprise a hydrogen partial pressure within the range of about 1,000 psia to about 3,000 psia, an average catalyst bed temperature within the range of about 700° F. to about 820° F., an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB to about 15,000 SCFB.

18. The process of claim 8, wherein said catalyst has about 0% to about 10% of its pore volume in pores having diameters that are smaller than 50 Å, about 30% to about 80% of its pore volume in pores having diameters within the range of about 50 Å to about 100 Å, about 10% to about 50% of its pore volume in pores having diameters within the range of about 100 Å to about 150 Å, and about 0% to about 10% of its pore volume in pores having diameters that are larger than 150 Å.

19. The process of claim 9, wherein said catalyst has about 0% to about 10% of its pore volume in pores having diameters that are smaller than 50 Å, about 30% to about 80% of its pore volume in pores having diameters within the range of about 50 Å to about 100 Å, about 10% to about 50% of its pore volume having diameters within the range of about 100 Å to about 150 Å, and about 0% to about 10% of its pore volume in pores having diameters that are larger than 150 Å.

20. The process of claim 11, wherein said catalyst has a pore volume within the range of about 0.5 cc/gm to about 0.7 cc/gm, a surface area within the range of about 150 m$^2$/gm to about 250 m$^2$/gm, and an average pore diameter within the range of about 110 Å to about 150 Å.

21. The process of claim 11, wherein said suitable conditions comprise a hydrogen partial pressure within the range of about 1,000 psia to about 3,000 psia, an average catalyst bed temperature within the range of about 700° F. to about 820° F., an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB to about 15,000 SCFB.

22. The process of claim 12, wherein said suitable conditions comprise a hydrogen partial pressure within the range of about 1,000 psia to about 3,000 psia, an average catalyst bed temperature within the range of about 700° F. to about 820° F., an LHSV within the range of about 0.1 volume of hydrocarbon per hour per volume of catalyst to about 3 volumes of hydrocaron per hour per volume of catalyst, and a hydrogen recycle rate or hydrogen addition rate within the range of about 2,000 SCFB to about 15,000 SCFB.

23. The process of claim 14, wherein said suitble conditions comprise a hydrogen partial pressure within the range of about 1,000 psia to about 3,000 psia, an average catalyst bed temperature within the range of about 700° F. to about 820° F., on LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB to about 15,000 SCFB.

24. The process of claim 15, wherein said catalyst has about 0% to about 10% of its pore volume in pores having diameters that are smaller than 50 Å, about 30% to about 80% of its pore volume in pores having diameters within the range of about 50 Å to about 100 Å, about 10% to about 50% of its pore volume in pores having diameters within the range of about 100 Å to about 150 Å, and about 0% to about 10% of its pore volume in pores having diameters that are larger than 150 Å.

25. The volume of claim 17, wherein said catalyst has about 0% to about 10% of its pore volume in pores having diameters that are smaller than 50 Å, about 30% to about 80% of its pore volume in pores having diameters within the range of about 50 Å to about 100 Å, about 10% to about 50% of its pore volume in pores having diameters within the range of about 100 Å to about 150 Å, and about 0% to about 10% of its pore volume in pores having diameters that are larger than 150 Å.

26. The process of claim 20, wherein said suitable conditions comprise a hydrogen partial pressure within the range of about 1,000 psia to about 3,000 psia, an average catalyst bed temperature within the range of about 700° F. to about 820° F., an LHSV within the range of about 0.1 volume of hydrocarbon per hour per volume of catalyst to about 3 volumes of hydrocarbon per hour per volume of catalyst, and a hydrogen recycle rate or hydrogen addition rate within the range of about 2,000 SCFB to about 15,000 SCFB.

27. The process of claim 23, wherein said catalyst has about 0% to about 10% of its pore volume in pores having diameters that are smaller than 50 Å, about 30% to about 80% of its pore volume in pores having diameters within the range of about 50 Å to about 100 Å, about 10% to about 50% of its pore volume in pores having diameters within the range of about 100 Å to about 150 Å, and about 0% to about 10% of it pore volume in pores having diameters that are larger than 150 Å.

* * * * *

UNITED STATES PATENT OFFICE
CERTIFICATE OF CORRECTION

Patent No. 4,188,284   Dated Feb. 12, 1980

Inventor(s) QUICK, LEONARD M., and HENSLEY, JR., ALBERT L.

It is certified that error appears in the above-identified patent and that said Letters Patent are hereby corrected as shown below:

Column 3, line 8, "meals" should be --metals--.

Column 3, line 45, "chromina" should be --chromia--.

Column 4, line 8, "prepaed" should be --prepared--.

Column 4, line 40, "boris" should be --boria--.

Column 4, line 47, "distillation of" should be --distillation or--.

Column 4, line 50, "alumina" should be --aluminum--.

Column 13, line 26, "DIAM., A" in Table I should be --DIAM., Å--.

Column 13, lines 30-35, each "A" in Table I should be --Å--.

Column 13, line 34, in Table I, for values corresponding to 300-400 Å pores, the values "0.4", "0.1", "0.2", "0.1", and "blank" should be --0.8--, --0.4--, --0.1--, --0.2--, and --0.1--.

Column 14, line 11, "API" should be --°API--.

Column 15, line 42, "API" should be --°API--.

Column 18, line 13, "of hydrogen" should be --or hydrogen--.

Column 19, line 17, "on LHSV" should be --an LHSV--.

Signed and Sealed this

Twenty-eighth Day of October 1980

[SEAL]

Attest:

SIDNEY A. DIAMOND

Attesting Officer

Commissioner of Patents and Trademarks